United States Patent
Choo

[11] Patent Number: 6,163,086
[45] Date of Patent: Dec. 19, 2000

[54] POWER SUPPLY CIRCUIT AND A VOLTAGE LEVEL ADJUSTING CIRCUIT AND METHOD FOR A PORTABLE BATTERY-POWERED ELECTRONIC DEVICE

[75] Inventor: Yeon-Chul Choo, Suwon, Rep. of Korea

[73] Assignee: SamSung Electronics Co., Ltd., Suwon, Rep. of Korea

[21] Appl. No.: 09/301,608

[22] Filed: Apr. 29, 1999

[30] Foreign Application Priority Data

Apr. 29, 1998 [KR] Rep. of Korea ...................... 98/15301

[51] Int. Cl.[7] ...................................... H02J 1/10
[52] U.S. Cl. .............................. 307/43; 320/118
[58] Field of Search ................... 307/43, 64, 65, 307/75, 125; 323/266, 270; 363/84, 89

[56] References Cited

U.S. PATENT DOCUMENTS

| | | |
|---|---|---|
| 4,843,299 | 6/1989 | Hutchings . |
| 5,049,804 | 9/1991 | Hutchings . |
| 5,055,763 | 10/1991 | Johnson et al. . |
| 5,166,596 | 11/1992 | Goedken . |
| 5,168,205 | 12/1992 | Kan . |
| 5,175,485 | 12/1992 | Joo . |
| 5,179,337 | 1/1993 | Staarman et al. . |
| 5,241,259 | 8/1993 | Patino et al. . |
| 5,355,071 | 10/1994 | Ishida et al. . |
| 5,359,318 | 10/1994 | Asai et al. . |
| 5,411,816 | 5/1995 | Patino et al. . |
| 5,477,123 | 12/1995 | Allen et al. . |
| 5,477,124 | 12/1995 | Tamai . |
| 5,479,083 | 12/1995 | Brainard . |
| 5,483,145 | 1/1996 | Shiojima . |
| 5,485,073 | 1/1996 | Kasashima et al. . |
| 5,497,068 | 3/1996 | Shiojima . |
| 5,541,492 | 7/1996 | Fernandez et al. . |
| 5,547,775 | 8/1996 | Eguchi et al. . |
| 5,553,294 | 9/1996 | Nanno et al. . |
| 5,561,361 | 10/1996 | Sengupta et al. . |
| 5,568,040 | 10/1996 | Krainer et al. . |
| 5,592,069 | 1/1997 | Dias et al. . |
| 5,592,070 | 1/1997 | Mino . |
| 5,598,041 | 1/1997 | Willis . |
| 5,608,273 | 3/1997 | Bartlett ....................................... 307/64 |
| 5,617,009 | 4/1997 | Takao et al. . |
| 5,621,301 | 4/1997 | Allen et al. . |
| 5,629,602 | 5/1997 | Makino . |
| 5,637,981 | 6/1997 | Nagai et al. . |
| 5,646,503 | 7/1997 | Stockstad . |
| 5,652,499 | 7/1997 | Morita et al. . |
| 5,694,028 | 12/1997 | Salmonson et al. . |
| 5,815,382 | 9/1998 | Saint-Pierre et al. . |
| 5,867,007 | 2/1999 | Kim . |
| 5,900,717 | 5/1999 | Lee . |
| 5,969,438 | 1/2000 | Odaohara ................................. 307/80 |
| 6,014,019 | 1/2000 | Parker ...................................... 323/273 |

FOREIGN PATENT DOCUMENTS

WO 96/21892  7/1996  WIPO .............................. G05F 1/56

*Primary Examiner*—Josie Ballato
*Assistant Examiner*—Robert L. Deberadinis
*Attorney, Agent, or Firm*—Robert E. Bushnell, Esq.

[57] ABSTRACT

A power supply circuit for AC/DC adapter-powered or battery-powered portable electronic devices, which has a linear regulator, and includes a voltage level adjusting circuit coupled to the linear regulator. The voltage level adjusting circuit lowers a voltage supplied from the AC/DC adapter to a predetermined level. In an embodiment, the level-adjusted voltage equals a voltage supplied from the battery. The linear regulator is therefore always provided with a constant voltage regardless of the power sources.

36 Claims, 4 Drawing Sheets

POWER SUPPLY CIRCUIT AND A VOLTAGE LEVEL ADJUSTING CIRCUIT AND METHOD FOR A PORTABLE BATTERY-POWERED ELECTRONIC DEVICE

CLAIM OF PRIORITY

This application makes reference to, incorporates the same herein, and claims all benefits accruing under 35 U.S.C. §119 from an application for A POWER SUPPLY CIRCUIT USEFUL FOR A PORTABLE BATTERY-POWERED ELECTRONIC DEVICE earlier filed in the Korean Industrial Property Office on the 29$^{th}$ of Apr. 1998 and there duly assigned Ser. No. 15301/1998.

BACKGROUND OF THE INVENTION

1. Field of the Invention

The present invention relates to a voltage level adjusting circuit and to a power supply circuit useful for a portable battery-powered electronic device and, more particularly, to a power supply circuit having a linear regulator for receiving a level adjusted voltage.

2. Related Art

Liner regulators are typically used for power conversion in portable electronic devices, such as portable computers and portable audio/video devices. A linear regulator accepts a power level from a power source, such as an alternating current/direct current (AC/DC) adapter or a battery, and conditions to provide regulated output voltages to system components at precise levels corresponding to the associated component biasing level. A variety of manufactures distribute these linear regulators. For example, National Semiconductor manufactures LM140A/LM140/LM340A/LM7800C series monolithic 3-terminal positive regulators, which employ internal current-limiting, thermal shutdown and safe-area compensation. These devices generally include advantageous features to protect the output voltages from short circuits by internal current limiter and thermal overload protection circuitry.

Considering output current characteristics of such linear regulators, even though a linear regulator intends to regulate its output voltage, its output current is inversely proportional to its input voltage and ambient temperature. In other words, stability of the linear regulator depends on its input voltage and temperature. Low input voltage and low temperature are thus necessary to acquire a stable output voltage of the linear regulator. In particular, regulating efficiency of the linear regulator is absolutely influenced by the difference between its input voltage and target output voltage.

Also, a portable computer exemplary of contemporary practice in the art is operated by either a battery or an AC/DC adapter. The battery is a rechargeable battery such as a Li-Ion battery, which is attachable to and detachable from the portable computer and generally provides a direct current (DC) voltage $V_{bat}$ of about 9–13 volts (V). The AC/DC adapter converts a commercial alternating current (AC) voltage of 110/220 volts into a DC voltage $V_{adp}$ of about 19 V. The AC/DC adapter is electrically coupled to an adapter connector of the portable computer.

Further, a power supply circuit exemplary of contemporary practice in the art for the portable computer includes a direct current/direct current (DC/DC) converter which is supplied with the DC voltages $V_{bat}$ and $V_{adp}$ through respective diodes. The DC/DC converter provides several DC voltages for individual circuit components of the portable computer. Specifically, the DC/DC converter includes two components, i.e., a system power supply unit and a linear regulator. The system power supply unit supplies various DC voltages for a system unit, including a central processing unit (CPU), other local controllers, several memories, etc., and for a direct current/alternating current (DC/AC) converter which supplies a liquid crystal device (LCD) panel with an AC voltage of about 500V for the backlighting of the panel.

The linear regulator provides a regulated voltage $V_{mc}$ to a microcontroller for system power management and the like. The microcontroller is presented with the regulated voltage $V_{mc}$ even during a system power-off mode where the power supplies of both the system unit and the DC/AC converter are interrupted. The linear regulator is applied with two different voltages (i. e, the battery-supplied voltage $V_{bat}$ of about 8–14 V and the adapter-supplied voltage $V_{adp}$ of about 18–20 V) and produces the regulated voltage $V_{mc}$ of 5V for the microcontroller, for example.

Generally, all components of a portable electronic device such as a portable computer can be designed from the portability view point. Thus, it is surely justifiable is that the linear regulator is designed for the battery-supplied voltage $V_{bat}$ rather than the adapter-supplied voltage $V_{adp}$. However, since the linear regulator has to be commonly used for the two different input voltages $V_{bat}$ and $V_{adp}$, its output voltage will vary with its input voltages, as discussed above. In particular, when the AC/DC adapter is used for the portable computer, the regulation efficiency of the linear regulator can be degraded since its input-output voltage difference is greater than that when the battery is used. Furthermore, when its temperature exceeds an acceptable limit because of the higher input voltage, it can stop supplying the power because of its inherent thermal protection. For these reasons, it can be difficult for the regulator to provide a stable output voltage when the portable computer is operated by the AC adapter.

U.S. Pat. No. 5,168,205 to Kan et al., entitled METHOD AND APPARATUS FOR CHARGING A BATTERY IN HIGH AMP AND AUTOMATIC CHARGING MODES, discloses a battery charger adapted to be electrically connected to the terminals of a battery for providing a charge to the battery, the battery charger comprising a device for supplying charging current to the battery, the current supplying device being operable to alternatively and selectively supply current at a first and second rate, the first rate providing for high rate charging of the battery, circuitry for sensing the voltage of the battery while the charger is connected to the battery, the sensing circuitry being adapted to be coupled to the battery, circuitry for alternatively selecting the first rate and the second rate, the selecting circuitry being coupled to the supplying circuitry and to the severing circuitry, circuitry for severing the supply of charging current to the battery when the second rate is selected, and when the sensing circuitry senses battery voltage in excess of a first predetermined threshold voltage, and for resuming the supply of current to the battery at the second rate when the sensing circuitry senses battery voltage below a second predetermined threshold voltage lower than the first predetermined threshold voltage, the severing circuitry being coupled to the current supplying device and to the sensing circuitry.

U.S. Pat. No. 5,411,816 to Patino, entitled METHOD AND APPARATUS FOR DETERMINING BATTERY CHARACTERISTICS, discloses a battery charging system including a battery and charger. It is disclosed that the battery includes a thermistor for determining the temperature of the battery and a resistor for informing the charger of the current capacity of the battery, and the charger includes a transistor for effectively switching between a measuring thermistor and a resistor at a charger input terminal.

U.S. Pat. No. 5,477,123 to Allen et al., entitled CONNECTION MULTIPLE BATTERIES TO BATTERY POWERED DEVICES, discloses a circuit for serially connecting multiple batteries to a battery-powered device such as a notebook computer or camcorder so that the device will serially charge or discharge the batteries. The device is disclosed to include at least two controllable switch circuits for selectively connecting batteries to the battery-powered device, a power flow sensor for sensing power flow from the device to the selected battery or vice versa, and a selector circuit for sequentially enabling the switch circuits to sequentially connect the batteries to the batter-powered device so that the batteries will sequentially charge or discharge.

U.S. Pat. No. 5,055,763 to Johnson et al., entitled ELECTRONIC BATTERY CHARGER DEVICE AND METHOD, discloses a battery charger device and method including a charging circuit having a source of charging energy and connections for installing one or more batteries to be charged, the device having a controllable switch associated with each battery to be charged and a microprocessor for controlling the switches to establish a charging sequence of distinct repeated charging periods for each battery, a display device associated with each battery under control of a microprocessor for individually indicating the charging status of each battery, the microprocessor having inputs at which various parameters with respect to the batteries being charged are applied such as battery voltages, ambient temperatures and charging currents, the microprocessor being programmed to terminate a voltage charging operation with respect to any one or more of the batteries if the measured difference between the charging and non charging voltage of any one or more of the batteries during succeeding charging periods exceeds some predetermined value, or if the charging current, or the ambient temperature of the battery being charged is outside of a predetermined range. It is disclosed that the present device and method can also include a back up termination means which responds to measurements of the battery voltage during succeeding charging periods and determines therefrom that on a predetermined number of succeeding cycles the condition of the battery voltage has changed by at least some predetermined amount.

U.S. Pat. No. 5,561,361 to Sengupta et al., entitled COMPUTER POWER SUPPLY AND BATTERY RECHARGING SYSTEM, discloses a power supply system for use with a portable personal computer, which includes a smart battery pack and a charging system. It is disclosed that the smart battery pack is provided with a dedicated microcontroller for controlling the charging level of the battery charger system. In particular, the status of the battery including the voltage and temperature of the battery is applied to the microcontroller along with a signal representative of the current load demand of the computer system. The microcontroller, in turn, is disclosed to provide a control signal in the form of fixed frequency, variable duty cycle pulse width modulated (PWM) signal for controlling the charging level of the battery charger system. It is disclosed that the duty cycle of the PWM signal is used to regulate the charging current supplied by the battery charger. In particular, the DC value of the PWM signal is used as a reference to control the charging current of the regulator to provide a variable output charging current with a relatively wide current range. As such, the battery charger is adapted to efficiently utilize the residual capacity of the battery charger system for optimizing charging of the battery packs during all operating conditions of the computer system. It is also disclosed that the use of a PWM signal from the battery pack to control the battery charger enables a single type of battery charger to be utilized for various battery technologies.

U.S. Pat. No. 5,598,041 to Willis, entitled EFFICIENT FAULT TOLERANT SWITCHING CIRCUIT FOR REDUNDANT D.C. POWER SUPPLIES, discloses two power sources which are connected to a load by a pair of MOSFET control switches, each connected respectively in series between one of the sources and the load, with their integral diodes forwardly biased between the power source and load. It is disclosed that an isolating MOSFET switch is connected in series between the pair of MOSFET control switches and the load with its integral diode back biased between the power sources and the load. Two control lines are disclosed to control the on-off state of all three MOSFET switches so that the isolating MOSFET switch is on when either control switch is on and is off when both control switches are off.

U.S. Pat. No. 5,621,301 to Allen, entitled CONNECTING MULTIPLE BATTERIES TO BATTERY POWERED DEVICES, discloses a circuit for serially connecting multiple batteries to a battery-powered device such as a notebook computer or camcorder so that the device will serially charge or discharge the batteries. The device is disclosed to include at least two controllable switch circuits for selectively connecting batteries to the battery-powered device, a power flow sensor for sensing power flow from the device to the selected battery or vice versa, and a selector circuit for sequentially enabling the switch circuits to sequentially connect the batteries to the battery-powered device so that the batteries will sequentially charge or discharge.

U.S. Pat. No. 5,629,602 to Makino, entitled PORTABLE ELECTRONIC EQUIPMENT WITH ATTACHMENT FOR SUPPLYING POWER AND CHARGING BATTERY, discloses an electronic equipment which includes a container unit for storing a battery or an AC adaptor which are detachable from the container unit and exchangeable with each other, an input port unit for receiving electric power from an external source, and a connection attachment unit for storing the battery and the AC adaptor which are detachable from the connection attachment unit, so that the AC adaptor can be stored in the connection attachment unit to supply DC power to the electronic equipment through the input port in order to charge the battery stored in the container unit, so that another battery can be stored in the connection attachment unit to supply DC power to the electronic equipment through the input port in order to serve as an expansion battery in addition to the battery stored in the container unit, or so that both the battery and the AC adaptor can be stored in the connection attachment unit to charge the battery.

U.S. Pat. No. 5,637,981 to Nagai et al., entitled METHOD FOR CHARGING A SECONDARY BATTERY AND CHARGER USED THEREFOR USING CONSTANT CURRENT AND CONSTANT VOLTAGE, discloses a secondary battery charging method and a charger used therefor, in which the method uses a constant current and a constant voltage such that the secondary battery is first charged with the constant current until the terminal voltage of the battery becomes a reference voltage higher than the full charging voltage for the battery and then further charged with the constant voltage which is equal to the full charging voltage. These two charging operations are switched by using various kinds of detection and control circuits.

U.S. Pat. No. 5,646,503 to Stockstad, entitled METHOD FOR BALANCING POWER SOURCES AND STRUCTURE THEREFOR, discloses a power source balancing circuit which balances two power sources such as two battery cells. When the power source balancing circuit is enabled, it is disclosed that it compares a current flowing through the first battery cell and a first resistor with a current flowing through the second battery cell and a second resistor. It is disclosed because the resistance of the first resistor is equal to that of the second resistor, a difference between the two currents indicates a differences between the voltages of the two battery cells. If a current difference larger than a predetermined limit is detected, the battery cell with a higher voltage is discharged through a corresponding discharge resistor by switching on a corresponding switch. The corresponding switch is controlled by a corresponding flip-flop.

U.S. Pat. No. 5,694,028 to Salmonson et al., entitled METHOD AND APPARATUS FOR ADJUSTING THE POWER SUPPLY VOLTAGE PROVIDED TO A MICROPROCESSOR, discloses a method and apparatus for adjusting power supplied to a device when the device has a first and a second power input. It is disclosed that a first voltage level and a ground potential are provided and a second voltage level is created as a function of the first voltage level. The second voltage level is then buffered with a power transistor and, if the second voltage level is needed for a particular device, the buffered second voltage level is selectively applied to the device. It is also disclosed that the circuit is disabled when the second voltage supply is not needed.

U.S. Pat. No. 5,815,382 to Saint-Pierre et al., entitled TRACKING CIRCUIT FOR POWER SUPPLY OUTPUT CONTROL, discloses a tracking circuit for a power supply which includes an inverter, a su m g network, and a driver circuit. The inverter is disclosed to invert a feedback voltage, which is a variable load voltage level, about an inverter reference voltage level to provide an inverter output voltage level. It is disclosed that the inverter output voltage level is summed or averaged with the output voltage of the power supply with respect to the voltage of the return line to provide a summing voltage. It is also disclosed that the driver circuit signals the primary control circuit to adjust the power supply output voltage level so that the summing voltage is held constant and equal with a driver reference voltage level.

U.S. Pat. No. 5,867,007 to Kim, entitled SELECTION CIRCUIT FOR DUAL BATTERIES IN A BATTERY POWERED ELECTRONIC DEVICE, discloses a battery selection circuit for dual battery packs which discharges the batteries in a stable way without regard to voltage differences. It is disclosed if one of the batteries is installed, the battery is effectively selected to prolong battery life. When this circuit is adopted in a notebook computer, it is disclosed that battery usage time is substantially increased. The battery selection circuit of Kim 007 includes a battery detector for sensing the existence of the first and second battery packs and for producing the detect signals corresponding thereto, and these detect signals are provided to a microcontroller to produce first and second battery discharge enable signals. In response to the first and second battery discharge enable signals, first and second electronic switches respectively connect each power supply line from the first and second batteries to a power supply circuit of the device. Reverse current blocking diodes are provided in series with the first and second switches, and a low resistive current path circuit is provided in parallel with the reverse current blocking diodes. It is disclosed that the first switch and second switch as well as the low resistive current path circuit can include MOSFET transistors. A control circuit including logic gates is provided for opening the low resistive current path circuit when both the first and second batteries are detected, and for closing the corresponding low restive current path circuit when one of the first and second batteries is detected.

SUMMARY OF THE INVENTION

It is therefore an object of the present invention to provide a portable electronic device power supply circuit with a linear regulator, which can provide stable output voltages independent of which one of the battery and the AC/DC adapter is used.

These and other objects, features and advantages of the present invention are provided by a portable electronic device which is operable in response to two different voltages, a first power supply voltage and a second power supply voltage respectively supplied from two power sources, such as an AC/DC adapter and a battery, respectively, and has a power supply circuit including a linear regulator, and includes a preferred voltage level adjusting circuit which is electrically coupled to the linear regulator. The voltage level adjusting circuit receives the first power supply voltage and provides a predetermined level-adjusted voltage which is preferably identical with the second power supply voltage. The linear regulator of the power supply circuit is provided with the level-adjusted voltage, thereby providing a stable regulated voltage regardless of which power source is being used.

According to a preferred aspect of the present invention, the voltage level adjusting circuit includes a voltage detector which detects the first power supply voltage and a variable resistance circuit that is coupled between the first power supply voltage and an input terminal of the linear regulator. The voltage detector generates a detection signal when the first power supply voltage is detected. The variable resistance circuit has one of a first resistance value and a second resistance value in accordance with the logic state of the detection signal. The variable resistance circuit allows the first power supply voltage to change into the predetermined voltage (preferably, the second power supply voltage) when the detection signal goes to a predetermined logic state as, for example, a logic "high" or a "1" state.

According to another aspect of the present invention, there is provided a method of supplying power to a portable electronic device which is operable in response to a first power supply voltage and a second power supply voltage supplied from two power sources, such as an AC/DC adapter and a battery, respectively, and includes a power supply circuit having a linear regulator, wherein the first power supply voltage is higher than the second power supply voltage. In this method, first, it is detected whether the first power supply voltage is applied. When the first power supply voltage is applied, the first power supply voltage is lowered to a predetermined voltage. Thereafter, the predetermined lowered voltage is provided to the linear regulator. The predetermined lowered voltage is preferably identical with the second power supply voltage.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

The present invention relates to an improvement in a power supply circuit for portable electronic devices, which have a linear regulator. In the following description, specific details are set forth to provide a thorough understanding of the present invention. Accordingly, the specification and drawings are to be regarded in an illustrative, rather than a restrictive sense.

Figure 1:
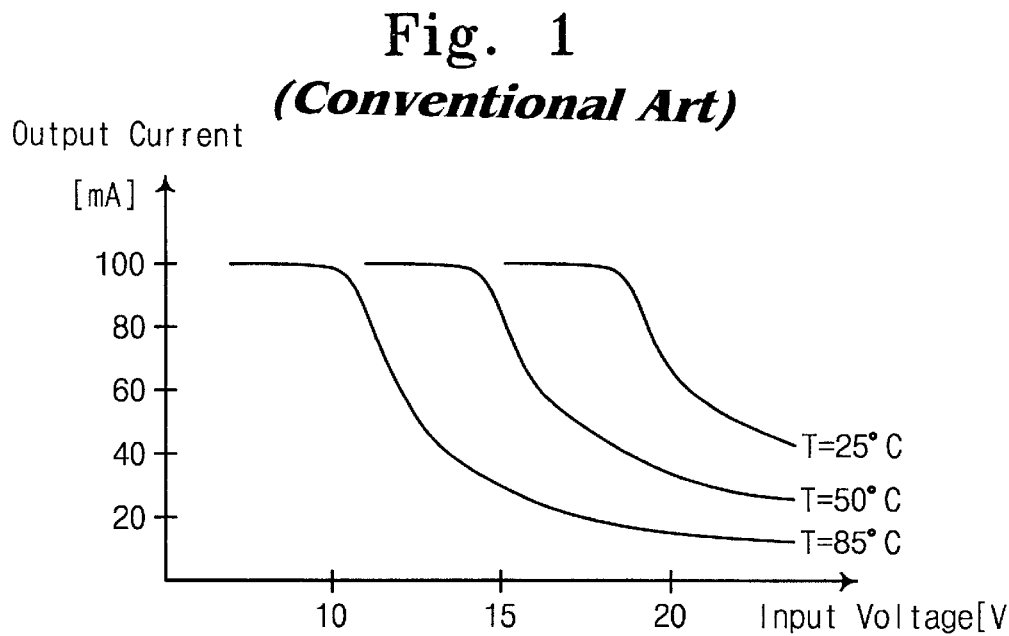
FIG. 1 is a graphical illustration exemplary of contemporary practice in the art of output current characteristics of a linear regulator related to an input voltage of the same.

FIG. 1 graphically illustrates output current characteristics of linear regulators exemplary of contemporary practice in the art. Even though a linear regulator intends to regulate its output voltage, its output current is inversely proportional to its input voltage and ambient temperature as shown in FIG. 1. In other words, stability of the linear regulator depends on its input voltage and temperature. Low input voltage and low temperature are thus necessary to acquire a stable output voltage of the linear regulator. In particular, regulating efficiency of the linear regulator is absolutely influenced by the difference between its input voltage and target output voltage.

Figure 2:
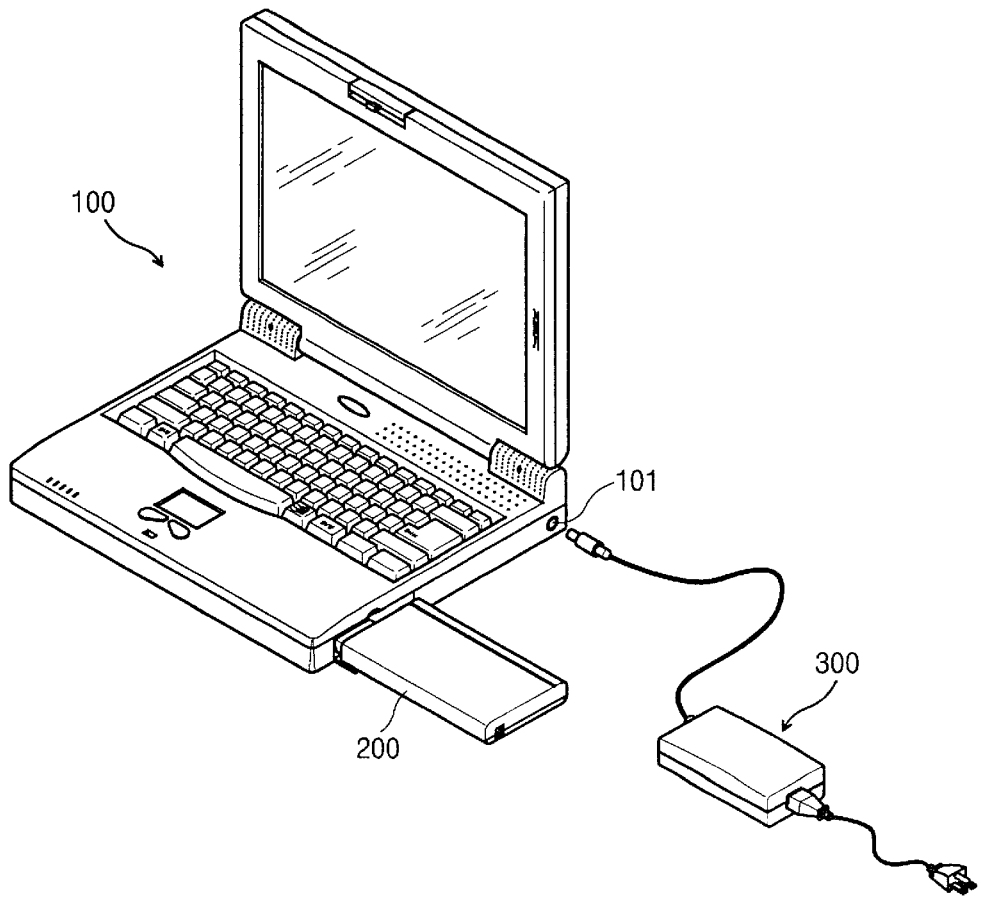
FIG. 2 is a perspective view illustrating a portable computer exemplary of contemporary practice in the art powered from either a battery or an AC/DC adapter to which the present invention is applicable.

FIG. 2 is a perspective view illustrating a portable computer 100 exemplary of contemporary practice in the art to which the present invention is applicable operated by either a battery 200 or an AC/DC adapter 300. The battery 200 is a rechargeable battery such as a Li-Ion battery, which is attachable to and detachable from the portable computer 100 and generally provides a DC voltage $V_{bat}$ of about 9–13 V. The AC/DC adapter 300 converts a commercial AC voltage of 110/220 volts into a DC voltage $V_{adp}$ of about 19 V. The AC/DC adapter 300 is electrically coupled to an adapter connector 101 of the portable computer 100.

Figure 3:
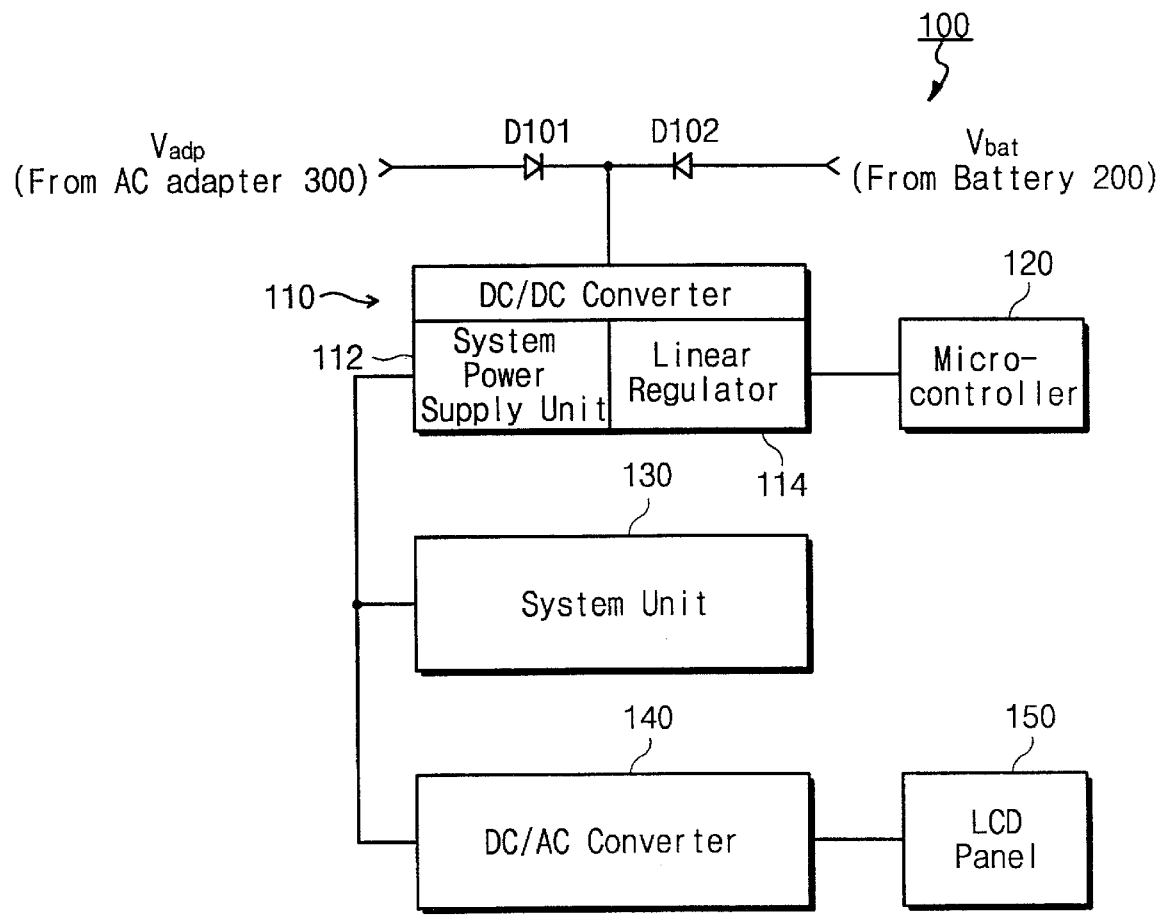
FIG. 3 is a block diagram illustrating a power supply circuit of the portable computer of FIG. 2.

FIG. 3 is a block diagram illustrating a power supply circuit exemplary of contemporary practice in the art for the portable computer 100 in FIG. 2. Referring to FIG. 3, the power supply circuit includes aDC/DC converter 110 which is supplied with the DC voltages $V_{bat}$ and $V_{adp}$ through respective diodes D101 and D102. The DC/DC converter 110 provides several DC voltages for individual circuit components of the portable computer 100. Specifically, the DC/DC converter 110 includes two components, i.e., a system power supply unit 112 and a linear regulator 114.

The system power supply unit 112 supplies various DC voltages for a system unit 130, including a central processing unit (CPU), other local controllers, several memories, etc., and for a DC/AC converter 140 which supplies a liquid crystal device (LCD) panel 150 with an AC voltage of about 500 V for the backlighting of the panel 150.

The linear regulator 114 provides a regulated voltage $V_{mc}$ to a microcontroller 120 for system power management and the like. The microcontroller 120 is presented with the regulated voltage $V_{mc}$ even during a system power-off mode where the power supplies of both the system unit 130 and the DC/AC converter 140 are interrupted.

Figure 4:
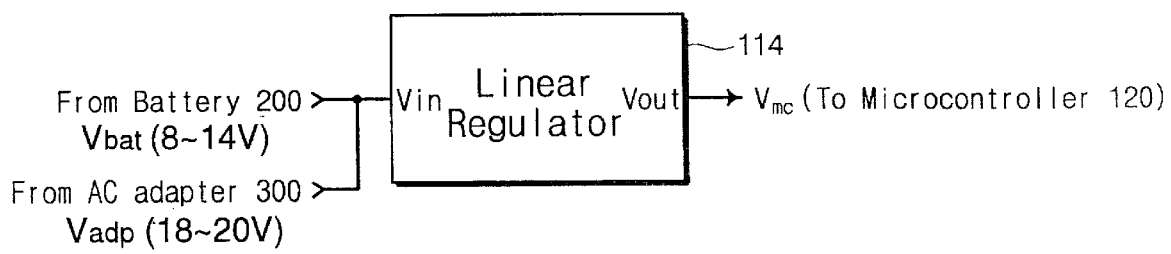
FIG. 4 is a block diagram illustrating input voltages of the linear regulator within the DC/DC converter of FIG. 3.

Referring to FIG. 4, the linear regulator 114 is applied with two different voltages (i.e, the battery-supplied voltage $V_{bat}$ of about 8–14 V and the adapter-supplied voltage $V_{adp}$ of about 18–20 V) and produces the regulated voltage $V_{mc}$ of 5V for the microcontroller 120, for example.

Generally, all components of a portable electronic device such as a portable computer can be designed from the portability view point. Thus, it is surely justifiable that the linear regulator 114 is designed for the battery-supplied voltage $V_{bat}$ rather than the adapter-supplied voltage $V_{adp}$. However, since the linear regulator 114 has to be commonly used for the two different input voltages $V_{bat}$ and $V_{adp}$, its output voltage will vary with its input voltages as discussed above. In particular, when the AC/DC adapter 300 is used for the portable computer 100, the regulation efficiency of the linear regulator 114 can be degraded since its input-output voltage difference is greater than that when the battery 200 is used. Furthermore, when its temperature exceeds an acceptable limit because of the higher input voltage, it can stop supplying the power because of its inherent thermal protection. For these reasons, it can be difficult for the regulator to provide a stable output voltage when the portable computer 100 is operated by the AC adapter 300.

Figure 5:
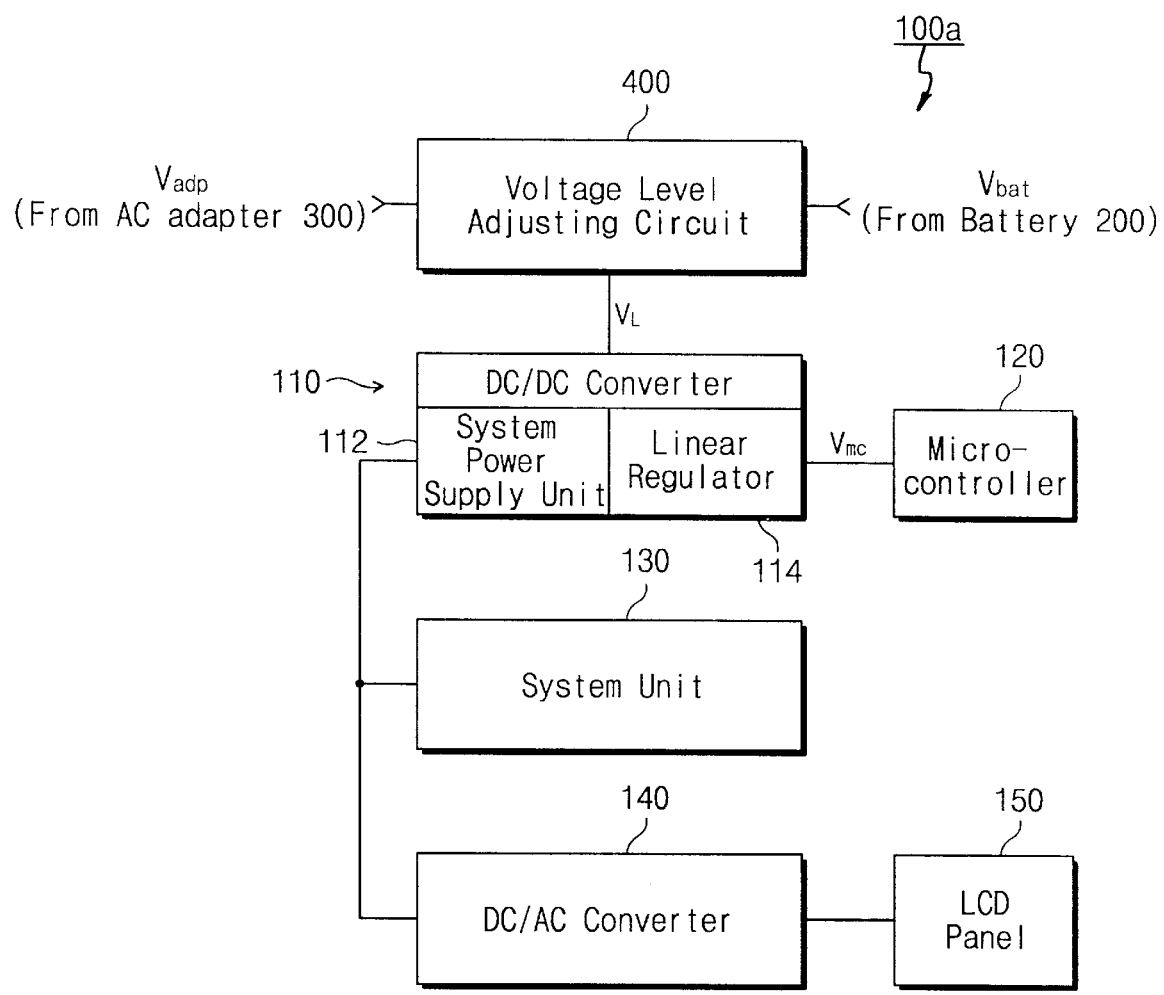
FIG. 5 is a block diagram illustrating a voltage level adjusting circuit and a power supply circuit according to a preferred embodiment of the present invention.

FIG. 5 is a block diagram illustrating a voltage level adjusting circuit and a power supply circuit according to a preferred embodiment of the present invention, which is useful for portable battery-powered or AC/DC adapter-powered electronic devices, such as portable computers and portable audio/video devices. For purposes of explanation, it is assumed that the power supply circuit is provided for a portable computer 100a, similar to portable computer 100 of FIG. 2.

Referring to FIG. 5, the power supply circuit of the invention includes a linear regulator 114, and also illustrated is a voltage level adjusting circuit 400 that is coupled to DC/DC converter 110.

The voltage level adjusting circuit 400 is supplied with two different DC voltages $V_{bat}$ of, for example, of about 8–14 V and $V_{adp}$ of, for example, about 18–20 V supplied from a battery 200 and an AC/DC adapter 300, respectively, similar to the battery 200 and AC/DC adapter 300 of FIG. 2. The voltage level adjusting circuit 400 detects whether the AC/DC adapter 300 is used as a power source, that is, whether the voltage $V_{adp}$ is supplied from the AC/DC adapter 300. Detecting the adapter-supplied voltage $V_{adp}$, the voltage level adjusting circuit 400 adjusts the voltage $V_{adp}$ to a predetermined voltage $V_L$ which is preferably identical with the battery-supplied voltage $V_{bat}$ of about 8–14 V, for example. When the voltage $V_{bat}$ is supplied from the battery 200 with the adapter-supplied voltage $V_{adp}$ not detected, the voltage level adjusting circuit 400 passes the battery-supplied voltage $V_{bat}$ to the linear regulator 114 without adjusting the voltage $V_{bat}$. Thus, the linear regulator 114 is always supplied with the constant voltage $V_L$, thereby providing a stable regulated voltage $V_{mc}$ of 5 V, for example, regardless of which power source is being used. The linear regulator 114 provides the regulated voltage $V_{mc}$ to a microcontroller 120 for system power management and the like. The microcontroller 120 is supplied with the regulated voltage $V_{mc}$ even during a system power-off mode in which the power supplies of both the system unit 130 and the DC/AC converter 140 are interrupted.

The DC/DC converter 110 provides several DC voltages for individual circuit components of the portable computer 100a. As can be seen from FIG. 5, the DC/DC converter 110 includes a system power supply unit 112, in addition to the linear regulator 114. The system power supply unit 112 supplies various DC voltages for a system unit 130, including a central processing unit (CPU), other local controllers, several memories, etc., and for a DC/AC converter 140 which supplies a liquid crystal device (LCD) panel 150 with an AC voltage of, for example, about 500 V for the back-lighting of the panel 150.

Figure 6:
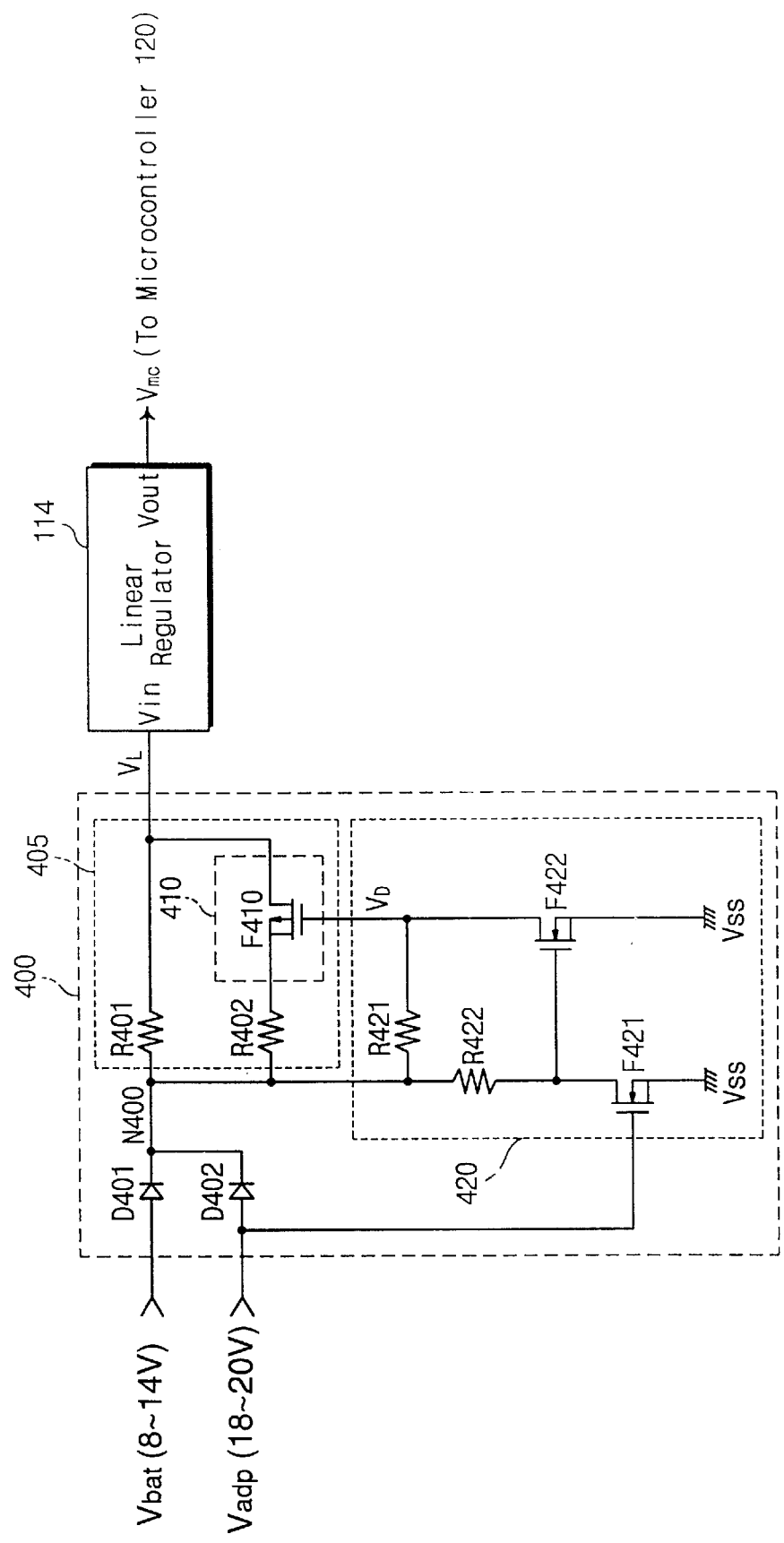
FIG. 6 is a detailed circuit diagram illustrating the voltage level adjusting circuit shown in FIG. 5.

Referring now to FIG. 6, FIG. 6 illustrates a detailed circuit configuration of an embodiment of the voltage level adjusting unit 400 of FIG. 5 according to the present invention. With reference to FIG. 6, the voltage level adjusting circuit 400 comprises two diodes D401 and D402, an adapter voltage detector 420, and a variable resistance circuit 405. The diode D401 has an anode coupled to the battery-supplied voltage $V_{bat}$ and a cathode coupled to a node N400. The diode D402 has an anode coupled to the adapter-supplied voltage $V_{adp}$ and a cathode coupled to the node N400. These diodes D401 and D402 are so-called blocking diodes which prevent current flowing from one power I source to the other. The adapter voltage detector 420 detects the adapter-supplied voltage $V_{adp}$. The variable resistance circuit 405 is coupled between the adapter-supplied voltage $V_{adp}$ and an input terminal $V_{in}$ of the linear regulator 114. The adapter voltage detector 420 generates a detection signal $V_D$ when the adapter-supplied voltage $V_{adp}$ is detected. The detection signal $V_D$ is provided to the variable resistance circuit 405.

Specifically, the variable resistance circuit 405 includes two resistors R401 and R402, and a switch 410 including aPMOS transistor F410. One end of the resistor R401 is coupled to the node N400 and the other end thereof is coupled to the input terminal Vin of the linear regulator 114. One end of the resistor R402 is coupled to the node N400 and the other end thereof is coupled to the input terminal Vin of the regulator 114 through a current path (i.e., a source-drain channel) of the PMOS transistor F410.

Further, the adapter voltage detector 420 includes two resistors R421 and R422 and two NMOS transistors F421 and F422. One end of the resistor R421 is coupled to the node N400 and the other end thereof is coupled to a control electrode (i.e., a gate) of the PMOS transistor F410 within the variable resistance circuit 405. One end of the resistor R422 is coupled to the node N400. The NMOS transistor F421 has its source-drain channel (i.e., a current path) coupled between the other end of the resistor R422 and the ground voltage Vss and its gate coupled to the adapter-supplied voltage $V_{adp}$. A source-drain channel of the NMOS transistor F422 is coupled between the gate of the PMOS transistor F410 and the ground voltage Vss, and a gate thereof is coupled between the resistor R422 and the current path of the NMOS transistor F421.

The switch 410 is selectively open/closed in response to the detection signal $V_D$ from the adapter voltage detector 420. More specifically, when the voltage $V_{adp}$ is supplied from the adapter 300, the NMOS transistors F421 and F422 are turned on and off, respectively. The detection signal $V_D$ goes to a first logic state (i.e., a high level of, for example, 5 V), so that the PMOS transistor F410 is turned off. This allows the variable resistance circuit 405 to have a first predetermined resistance value (approximately, the resistance value of R401). Conversely, when the voltage $V_{adp}$ is not supplied, the NMOS transistors F421 and F422 are turned off and on, respectively. The detection signal $V_D$ in this case goes to a second logic state (i.e., a low level of, for example, 0 V) so that the PMOS transistor F410 is turned on. This allows the variable resistance circuit 405 to have a second predetermined resistance value (approximately, the total resistance value of the resistors R401 and R402 coupled in parallel) relatively smaller than the first resistance value. As described above, the resistance value of the variable resistance circuit 405 varies with the logic state of the detection signal $V_D$.

The variable resistance circuit 405 drops the adapter-supplied voltage $V_{adp}$ when the detection signal $V_D$ goes high. In this case, the variable resistance circuit 405 lowers the adapter-supplied voltage $V_{adp}$ to the predetermined voltage level $V_L$ by dividing the voltage $V_{adp}$ through the resistors R401 and R402, allowing the linear regulator to be always provided with the same constant voltage as the battery voltage although the AC/DC adapter is used for the portable computer as a power source. Accordingly, the linear regulator characteristic degradation due to the input voltage and temperature variations can be advantageously prevented.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A portable electronic device having a level-adjusted voltage, comprising:

a voltage level adjusting circuit for selectively receiving a first power supply voltage from a first power source, and for selectively receiving a second power supply voltage from a second power source, the first power supply voltage differing from the second power supply voltage, and for providing a level-adjusted voltage, the level-adjusted voltage being equal to a predetermined voltage when the first power supply voltage is selectively received by said voltage level adjusting circuit and the level-adjusted voltage being equal to the second power supply voltage when the second power supply voltage is selectively received by said voltage level adjusting circuit; and a power supply circuit having a linear regulator for receiving the level-adjusted voltage and for providing a regulated voltage for the portable electronic device.

2. The portable electronic device according to claim 1, further comprised of the predetermined voltage being equal to the second power supply voltage.

3. The portable electronic device according to claim 2, further comprised of the first power supply voltage being greater than the second power supply voltage.

4. The portable electronic device according to claim 1, further comprised of said first power source comprising an alternating current/direct current adapter and said second power source comprising a battery, and said first power supply voltage being higher than said second power supply voltage.

5. The portable electronic device according to claim 4, further comprising a controller for performing power management of the portable electronic device, the controller being supplied with the regulated voltage from said power supply circuit.

6. The portable electronic device according to claim 5, further comprised of the predetermined voltage being equal to the second power supply voltage.

7. The portable electronic device according to claim 1, further comprising a controller for performing power management of the portable electronic device, the controller being supplied with the regulated voltage from said power supply circuit.

8. A portable electronic device having a level-adjusted voltage, comprising:
- a voltage level adjusting circuit for selectively receiving a first power supply voltage from a first power source, and for selectively receiving a second power supply voltage from a second power source, the first power supply voltage differing from the second power supply voltage, and for providing a level-adjusted voltage that is equal to a predetermined voltage; and
- a power supply circuit having a linear regulator for receiving the level-adjusted voltage and for providing a regulated voltage for the portable electronic device, said voltage level adjusting circuit comprising:
  - a first diode having an anode coupled to the first power supply voltage and a cathode coupled to a node;
  - a second diode having an anode coupled to the second power supply voltage and a cathode coupled to the node;
  - a voltage detector for detecting the first power supply voltage and for generating a detection signal in response to detection of the first power supply voltage; and
  - a variable resistance circuit coupled to the first power supply voltage through the node and to an input terminal of the linear regulator of said power supply circuit, for changing the first power supply voltage into the predetermined voltage in response to the detection signal from the voltage detector.

9. The portable electronic device according to claim 8, further comprised of said first power source comprising an alternating current/direct current adapter and said second power source comprising a battery, and said first power supply voltage being higher than said second power supply voltage.

10. The portable electronic device according to claim 9, further comprised of the predetermined voltage being equal to the second power supply voltage.

11. The portable electronic device according to claim 8, further comprised of the predetermined voltage being equal to the second power supply voltage.

12. A portable electronic device having a level-adjusted voltage, comprising:
- a voltage level adjusting circuit for selectively receiving a first power supply voltage from a first power source, and for selectively receiving a second power supply voltage from a second power source the first power supply voltage differing from the second power supply voltage, and for providing a level-adjusted voltage that is equal to a predetermined voltage: and
- a power supply circuit having a linear regulator for receiving the level-adjusted voltage and for providing a regulated voltage for the portable electronic device, said voltage level adjusting circuit comprising:
  - a first diode having an anode coupled to the first power supply voltage and a cathode coupled to a node;
  - a second diode having an anode coupled to the second power supply voltage and a cathode coupled to the node;
  - a first resistor having a first end coupled to the node and a second end coupled to an input terminal of the linear regulator of said power supply circuit;
  - a second resistor having a first end coupled to the node and a second end;
  - a voltage detector for detecting the first power supply voltage and for generating a detection signal having a first level in response to detection of the first power supply voltage and having a second level in response to an absence of detection of the first power supply voltage; and
  - a switch coupled between the second end of the second resistor and the input terminal of the linear regulator of said power supply circuit, said switch being coupled to said voltage detector and for selectively being open and closed in response to a level of the detection signal from the voltage detector.

13. The portable electronic device according to claim 12, further comprised of said first power source comprising an alternating current/direct current adapter and said second power source comprising a battery, and said first power supply voltage being higher than said second power supply voltage.

14. The portable electronic device according to claim 13, further comprised of the predetermined voltage being equal to the second power supply voltage.

15. The portable electronic device according to claim 12, further comprised of said switch including a transistor having a current path coupled between the second end of the second resistor and the input terminal of the linear regulator of said power supply circuit and having a control electrode coupled to said voltage detector to receive the detection signal.

16. The portable electronic device according to claim 15, further comprised of said first power source comprising an alternating current/direct current adapter and said second power source comprising a battery, and said first power supply voltage being higher than said second power supply voltage.

17. The portable electronic device according to claim 16, further comprised of said first resistor, said second resistor and said switch comprise a variable resistance circuit for changing the first power supply voltage into the predetermined voltage, when the first power supply voltage is detected by said voltage detector.

18. The portable electronic device according to claim 12, further comprised of said voltage detector comprising:
- a third resistor having a first end coupled to the node and a second end coupled to said switch;
- a fourth resistor having a first end coupled to the node and a second end;
- a first transistor having a current path coupled between the second end of the fourth resistor and a ground voltage and having a control electrode coupled to the first power supply voltage; and
- a second transistor having a current path coupled between said switch and the ground voltage and having a control electrode coupled to the second end of the fourth resistor.

19. The portable electronic device according to claim 18, further comprised of said first power source comprising an alternating current/direct current adapter and said second power source comprising a battery, and said first power supply voltage being higher than said second power supply voltage.

20. A portable electronic device having a level-adjusted voltage, comprising:
   a voltage level adjusting circuit for selectively receiving a first power supply voltage from a first power source, and for selectively receiving a second power supply voltage from a second power source, the first power supply voltage differing from the second power supply voltage, and for providing a level-adjusted voltage that is equal to a predetermined voltage; and
   a power supply circuit having a linear regulator for receiving the level-adjusted voltage and for providing a regulated voltage for the portable electronic device, said voltage level adjusting circuit comprising:
      a first diode having an anode coupled to the first power supply voltage and a cathode coupled to a node;
      a second diode having an anode coupled to the second power supply voltage and a cathode coupled to the node;
      a first resistor having a first end coupled to the node and a second end coupled to an input terminal of the linear regulator of said power supply circuit;
      a second resistor having a first end coupled to the node and a second end;
      a PMOS transistor having a source-drain channel coupled between the second end of the second resistor and the input terminal of the linear regulator of said power supply circuit and having a gate;
      a third resistor having a first end coupled to the node and a second end coupled to the gate of the PMOS transistor;
      a fourth resistor having a first end coupled to the node and a second end;
      a first NMOS transistor having a source-drain channel coupled between the second end of the fourth resistor and a ground voltage and having a gate coupled to the first power supply voltage; and
      a second NMOS transistor having a source-drain channel coupled between the gate of the PMOS transistor and the ground voltage and having a gate coupled to the second end of the fourth resistor.

21. The portable electronic device according to claim 20, further comprised of said first power source comprising an alternating current/direct current adapter and said second power source comprising a battery, and said first power supply voltage being higher than said second power supply voltage.

22. The portable electronic device according to claim 21, further comprised of the predetermined voltage being equal to the second power supply voltage.

23. A method of supplying power having a level adjusted voltage to a portable electronic device, comprising the steps of:
   providing selectively a first power supply voltage from a first power source;
   providing selectively a second power supply voltage from a second power source, the second power supply voltage being different from the first power supply voltage;
   providing a voltage level adjusting circuit for selectively receiving the first power supply voltage and the second power supply voltage and for providing a level-adjusted voltage, the level-adjusted voltage being equal to a predetermined voltage when the voltage level adjusting circuit selectively receives the first power supply voltage, and the level-adjusted voltage being equal to the second power supply voltage when the voltage level adjusting circuit selectively receives the second power supply voltage;
   providing a power supply circuit having a linear regulator for receiving the level-adjusted voltage from the voltage level adjusting circuit;
   determining whether the first power supply voltage is supplied to the voltage level adjusting circuit;
   adjusting the first power supply voltage to the predetermined voltage when the first power supply voltage is supplied to the voltage level adjusting circuit; and
   providing the level-adjusted voltage to the linear regulator of the power supply circuit to provide a regulated voltage for the portable electronic device.

24. The method of claim 23, further comprised of said predetermined voltage being identical to the second power supply voltage.

25. The method of claim 24, further comprised of the first power supply voltage being greater than the second power supply voltage.

26. The method of claim 24, further comprised of said first power source comprising an alternating current/direct current adapter and said second power source comprising a battery, and said first power supply voltage being higher than said second power supply voltage.

27. A method of supplying power to a portable electronic device, comprising the steps of:
   selectively applying a first power supply voltage and a second power supply voltage to the portable electronic device;
   detecting whether the first power supply voltage is applied to the portable electronic device;
   adjusting the first power supply voltage to a predetermined voltage when the first power supply voltage is applied to the portable electronic device; and
   providing the predetermined voltage to the portable electronic device when the first power supply voltage is selectively applied to the portable electronic device, and providing the second power supply voltage to the portable electronic device when the second power supply voltage is selectively applied to the portable electronic device.

28. The method of claim 27, further comprised of said predetermined voltage being identical to the second power supply voltage.

29. The method of claim 28, further comprised of the first power supply voltage being supplied from an alternating current/direct current adapter and the second power supply voltage being supplied from a battery.

30. The method of claim 29, further comprised of the first power supply voltage being greater than the second power supply voltage.

31. The method of claim 28, further comprised of the first power supply voltage being greater than the second power supply voltage.

32. A portable electronic device having a level-adjusted voltage, comprising:
   a voltage level adjusting circuit for selectively receiving a first power supply voltage from a first power source, and for selectively receiving a second power supply voltage from a second power source, the first power supply voltage differing from the second power supply voltage, and for providing a level-adjusted voltage that is equal to a predetermined voltage, said voltage level adjusting circuit including a voltage detector for detecting the first power supply voltage and for generating a detection signal in response to detection of the first power supply voltage, and said voltage level adjusting circuit including avariable resistance circuit coupled to the first power supply voltage for changing the first power supply voltage into the predetermined voltage in response to the detection signal from the voltage detector; and a power supply circuit having a linear regulator for receiving the level-adjusted voltage and for providing a regulated voltage for the portable electronic device.

33. The portable electronic device according to claim 32, further comprised of the predetermined voltage being equal to the second power supply voltage.

34. The portable electronic device according to claim 33, further comprised of the first power supply voltage being greater than the second power supply voltage.

35. The portable electronic device according to claim 32, further comprised of the first power supply voltage being greater than the second power supply voltage.

36. The portable electronic device according to claim 32, further comprised of said first power source comprising an alternating current/direct current adapter and said second power source comprising a battery, and said first power supply voltage being higher than said second power supply voltage.

* * * * *